US009203616B1

(12) United States Patent
Brown et al.

(10) Patent No.: US 9,203,616 B1
(45) Date of Patent: Dec. 1, 2015

(54) MULTI-SERVER FAULT TOLERANT DATA STORE UPDATE

(71) Applicant: EMC Corporation, Hopkinton, MA (US)

(72) Inventors: Jaimee Brown, Fortitude Valley (AU); Eric Young, Annerley (AU); David Paul Makepeace, Middle Park (AU)

(73) Assignee: EMC Corporation, Hopkinton, MA (US)

( * ) Notice: Subject to any disclaimer, the term of this patent is extended or adjusted under 35 U.S.C. 154(b) by 120 days.

(21) Appl. No.: 13/873,365

(22) Filed: Apr. 30, 2013

(51) Int. Cl.
*H04L 9/08* (2006.01)
*H04L 9/32* (2006.01)

(52) U.S. Cl.
CPC .............. *H04L 9/085* (2013.01); *H04L 9/0891* (2013.01); *H04L 9/3273* (2013.01)

(58) Field of Classification Search
CPC .............................. H04L 9/085; H04L 9/0891
USPC ........................................................ 713/169
See application file for complete search history.

(56) References Cited

U.S. PATENT DOCUMENTS

| 5,625,692 | A  | * | 4/1997 | Herzberg et al. | ............. 380/286 |
| 6,192,472 | B1 |   | 2/2001 | Garay et al. | |
| 7,725,730 | B2 | * | 5/2010 | Juels et al. | ..................... 713/183 |
| 8,151,333 | B2 | * | 4/2012 | Zhu et al. | ....................... 713/170 |
| 8,634,560 | B1 | * | 1/2014 | Ng et al. | ......................... 380/273 |
| 8,767,964 | B2 | * | 7/2014 | Bae et al. | ....................... 380/277 |
| 2013/0227292 | A1 | * | 8/2013 | Suffling | ......................... 713/171 |

* cited by examiner

*Primary Examiner* — Dede Zecher
*Assistant Examiner* — Vadim Savenkov
(74) *Attorney, Agent, or Firm* — BainwoodHuang

(57) ABSTRACT

An improved technique involves storing current and one previous version of the secret shares in their respective databases. Along these lines, authentication servers split the proactivization process into several phases, during which they communicate a failure or success to complete that phase. During one of these phases, the authentication servers delete a previous version of their secret share and label the current version as the previous version. At another phase, the authentication servers generate a new version of each secret share (via one way deterministic transform) and store that new version alongside that previous version. Accordingly, when a user submits secret shares for authentication to the authentication servers, each authentication server determines the state of the corresponding authentication server and chooses the secret share according to that state.

19 Claims, 7 Drawing Sheets

MULTI-SERVER FAULT TOLERANT DATA STORE UPDATE

BACKGROUND

Systems that process electronic transactions frequently use passwords to authenticate a party wishing to access resources via those transactions. For example, an online bank requires that its customers log in using an identifier and password. Such systems typically store these passwords in a secure database; when a user attempts to log into an account of the online bank, the bank retrieves the password corresponding to the user identifier and compares the password to that submitted by the user.

Many such systems store these passwords in plain text in the database. Nevertheless, all accounts could be compromised if an attacker managed to obtain a copy of this password database. To improve security, some systems store a secure hash (a one-way function) of each password instead of the plain text. In this way, an attacker will not have the passwords even if she gains hold of the database.

That said, while an attacker in possession of the password database does not have the passwords, she is at liberty to make repeated guesses until an account is compromised. The more accounts in the password database, the greater the probability that one of the accounts has a weak password. When all passwords are hashed using the same one-way function, an attacker can reduce the computational effort required to compromise one of many accounts by generating a list of pre-hashed guesses—known as a "rainbow table"—and finding the intersection of the hashed guesses and the hashed passwords. To mitigate the effectiveness of rainbow tables, some other systems then store passwords using a salted hash, which requires an attacker to re-hash each guess for each account.

Nevertheless, while such salted hashes increases the computational effort required for an attacker to compromise an account, they do not eliminate the problem of attackers being able to guess weak passwords within a database. To further improve security, some systems mathematically split each password hash into two pieces of data ("shares"), such that each share on its own conveys no information about the original password hash. These systems store each share in a different database that may be in a different physical location and protected by different security measures. A successful attack would require that the attacker steal both databases. For this technique to be secure, a system implementing it satisfies the following:

1. There are three distinct systems, preferably running on distinct hardware:
    a. The system that is running the client application that is utilizing the password storage and authentication service, such as an online banking system. "Client" is the networking term, as in "client/server".
    b. A server that is running one half of the password storage and authentication service with the database that contains one of the shares for each account (the "red" server).
    c. A server that is running the other half of the password storage and authentication service with the database that contains the other share for each account (the "blue" server).
2. When storing or authenticating a password, the client application splits the password and sends one share to each of the servers and neither of the servers is ever in possession of both password shares or the original password or password hash.
3. The password typed by the user and the corresponding password hash exists ephemerally on the system that is running the client application when a password is either stored or authenticated.
4. Authentication is done cooperatively using an algorithm that does not require the password hash to be reassembled from the two shares at any time or in any location.

It should be understood that this split-password approach is still vulnerable to attack if an attacker has sufficient time to eventually compromise both the red and blue servers. As a final improvement, if an attacker has stolen one of the databases, it is possible to update all the shares on both servers in a way that renders the stolen database useless to the attacker. Such an improvement involves having the red and blue servers agree on a random value and then apply that value to all the shares, creating a new version of each share; this process has the advantage of not needing to reassemble password hashes. Such a process is called "proactivization," and, if performed regularly, it reduces the time window during which an attacker must compromise both servers to achieve a successful attack.

It should be understood that proactivization can be a complex process which must take certain practical considerations into account. For example, such a proactivization process may take a long time because each password entry must be modified in both databases. Also, the password storage and authentication operations must remain available during such a proactivization process. Further, the red and blue servers must work as independently as possible in order to maintain the security of the system. Finally, for an authentication operation to succeed, the red and blue servers must use the same version of the two shares corresponding to the password being authenticated.

The above-described proactive approach to updating secret shares involves synchronization between the red and blue servers. Conventional approaches to proactively updating secret shares for secrets such as passwords involve replacing, by one of the servers, each current share in that server's database with a new share; this replacement is performed synchronously with that of the other server. In this way, each server computes the new version of the share, erases the current version of the share, and stores the new version.

SUMMARY

Unfortunately, there are deficiencies with the above-described conventional approaches to proactively updating secrets. For example, one of the servers may shut down or otherwise go out of synchronization with the other server while proactively updating secret shares. In this case, the secret shares accessed by the red and blue servers will have different versions of the secret shares, making authentication impossible. To mitigate such an occurrence, additional synchronization between the red and blue servers may be added to ensure that each secret share update occurs in lock-step with the corresponding secret share update in other controllers. This synchronization adds significant communication overhead. For example, synchronizing each secret share update in a database containing millions of secrets requires that communication occurs between controllers for each of the million secrets.

In contrast to the conventional approaches to proactively updating secrets in which a failure to synchronize results in either inconsistent secret shares, an improved technique involves storing one current and one previous version of the secret shares in their respective databases. Along these lines, authentication servers split the proactivization process into several phases, during which they communicate a failure or success to complete that phase. During one of these phases, the authentication servers delete a previous version of their secret share and label the current version as the previous version. At a second phase, the authentication servers generate a new version of each secret share and store that new version alongside that previous version. Accordingly, when a user submits secret shares to the authentication servers for authentication, each authentication server determines the state of the corresponding authentication server and chooses the secret share according to that state.

Advantageously, the improved technique allows for minimal overhead due to synchronization during proactivization, as servers only need to communicate with each other before and after the full set of new secret share have been computed. Additionally, by having a previous version stored in the database, an authentication server has an option to use that previous version if it finds a problem in the proactivization process. Further, that server is aware of whether such a problem exists because there is a protocol for establishing a proactivization state of the authentication servers during this process.

One embodiment of the improved technique is directed to a method of synchronizing a set of authentication servers. The method includes receiving, by a first authentication server of the set of authentication servers, a request from a second authentication server of the set of authentication servers to perform a first proactivization operation, each authentication server of the set of authentication servers being configured to verify a secret share of a secret received from a client against a version of a secret share stored in a respective database of that authentication server, the first proactivization operation serving to generate, by the first authentication server, a new version of a first secret share, a version of the first secret share serving to reveal the secret when combined with that version of a second secret share stored in a respective database of a second authentication server of the set of authentication servers. The method also includes sending, from the first authentication server, a notification to the second authentication server to begin performing a second proactivization operation, the second proactivization operation serving to generate, by the second authentication server, a new version of the second secret share. The method further includes performing, by the first authentication server, the first proactivization operation. The method further includes storing, by the first authentication server, a previous version of the first secret share on the respective database while generating the new version of the first secret share and while performing the first proactivization operation.

Additionally, some embodiments of the improved technique are directed to a system constructed and arranged to synchronize a set of authentication servers. The system includes a first server and a second server, each having a network interface, memory, and a controller including controlling circuitry, the controlling circuitry being constructed and arranged to carry out the method of synchronizing a set of authentication servers.

Furthermore, some embodiments of the improved technique are directed to a computer program product having a non-transitory computer readable storage medium which stores code including a set of instructions which, when executed by a computer, cause the computer to carry out the method of synchronizing a set of authentication servers.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves storing current and one previous version of the secret shares in their respective databases. Along these lines, authentication servers split the proactivization process into several phases, during which they communicate a failure or success to complete that phase. The two systems synchronize with each other at these points. During one of these phases, the authentication servers generate a new version of each secret share and store that new version alongside that previous version. At another phase, the authentication servers delete a previous version of their secret share and label the current version as the previous version. Accordingly, when a client submits secret shares to the authentication servers for authentication, each authentication server determines the version of the database and chooses that version of the secret share. The version is updated when the proactivization process has finished, so any validation requests that are submitted while the proactivization is occurring will be validated against the 'old' version. When the proactivization succeeds on both servers, the servers will use the new version and delete the old version of the database.

Advantageously, the improved technique allows for minimal overhead due to synchronization during proactivization, as servers only need to communicate with each other before and after secrets have been updated to the new version. Additionally, by having a previous version stored in the database, an authentication server has an option to use that previous version if it finds a problem in the proactivization process. Upon failure to proactivize, the servers can just throw away the new version of the shares and continue using the old version. There is no partial update data to be rolled back. Further, that server is aware of whether such a problem exists because there is a protocol for establishing a proactivization state of the authentication servers during this process.

Figure 1:
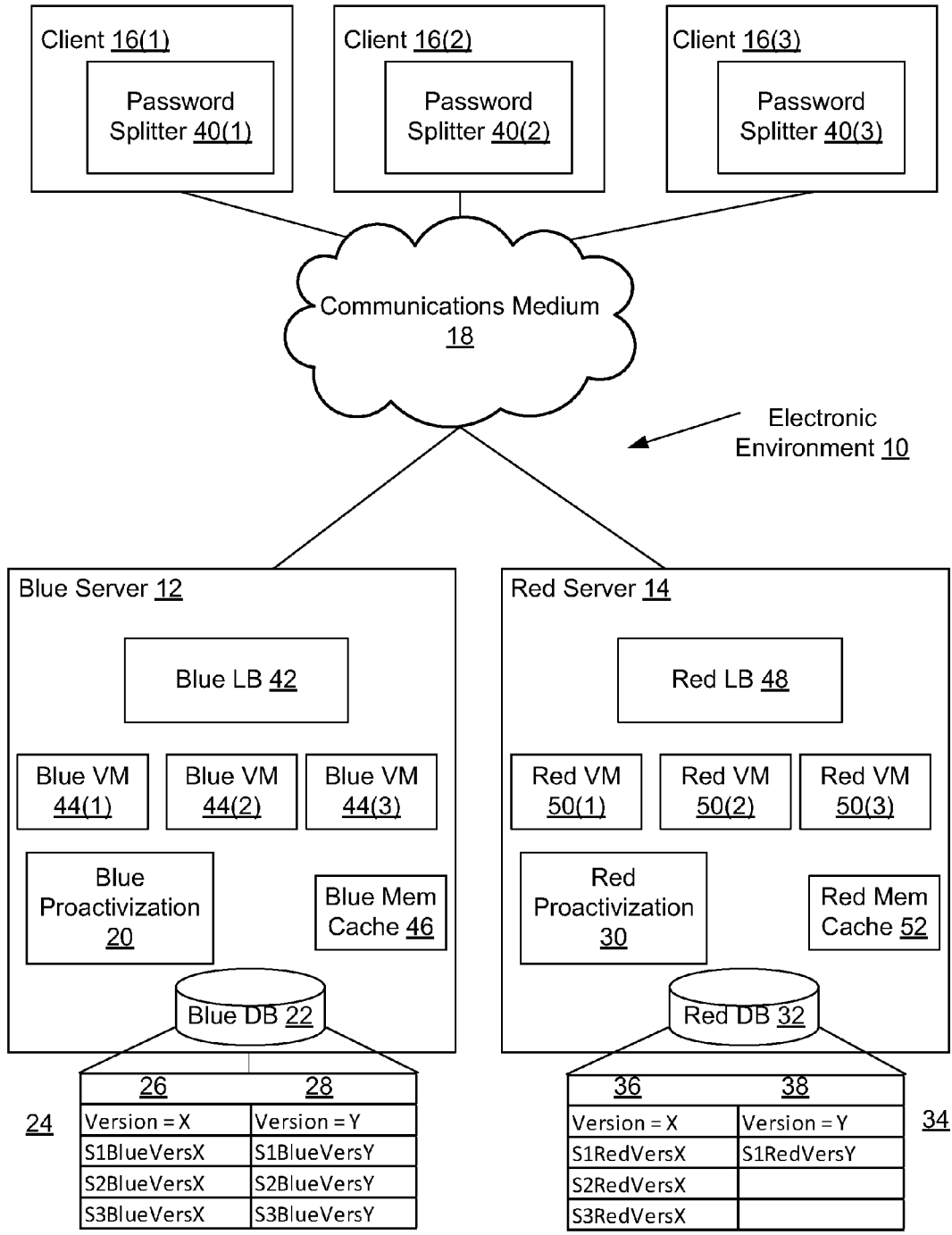
FIG. 1 is a block diagram illustrating an example electronic environment for carrying out the improved technique.

FIG. 1 illustrates an example electronic environment 10 for carrying out the improved technique. Electronic environment 10 includes blue server 12, red server 14, clients 16(1), 16(2), and 16(3) (clients 16), and communications medium 18.

Communication medium 18 provides network connections between blue server 12, red server 14, and clients 16. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Clients 16 are constructed and arranged to generate and send secret shares (e.g., password shares) to blue server 12 and red server 14 via communications medium 18, for the purpose of authentication for, e.g., accessing an account. Clients 16 are taken here to be desktop computers, but may be any form of a computing device, e.g. but not limited to laptops, smartphones, and tablet computers. Clients 16 each include respective password splitters 40 for this purpose.

Password splitter 40 is configured to split a password (i.e., a generic secret) into a pair of shares according to a formulation that may be interpreted by blue server 12 and red server 14 and compared with a version of a secret share stored within these respective servers 12 and 14 during an equivalence operation. Such an equivalence operation is described in detail below with respect to FIG. 4.

Red server 14 and blue server 12 are constructed and arranged to carry out, in addition to the above authentication procedure, proactivization activities in synchronization with each other. Red server 14 differs from blue server 12, however, in that red server 14 is configured to contact blue server 12 at update time, and not vice-versa. Moreover, blue server 12 determines the version number used for equivalence, i.e., authentication during proactivization operations, and shares that version number with red server 14. Red server 14 and blue server 12 each include, respectively, a database 32 and 22.

Databases 32 and 22 are each configured to store two secret splits, i.e., two versions of secret shares (36 and 38 for red server 14, 26 and 28 for blue server 24) corresponding to a secret from each client 16 in entries 34 and 24, as well as a split version number for each secret split (not pictured) and a secret identifier.

During operation, blue server 12 receives a request (not shown) from red server 14 to begin a proactivization operation. Such a proactivization operation involves providing new versions of secret shares for each secret share stored in database 22, each share corresponding to a client 16. The request includes information such as an authentication identifier and a public key of a public/private key pair of red server 14.

Once blue server 12 receives the request, blue server 12 generates some information to send to red server 14 to ensure that the respective proactivization processes are synchronized. For example, blue server 12 generates its own private/public key pair and a random number from that key pair and the information received in the request. Blue server 12 then sends a response to the request that contains its public key and a hash of the random number to red server 14.

Once red server 14 receives this response, it generates its own check number and compares that check number to the check number received in the response. If the check numbers match, then red server 14 sends blue server 12 a notification containing a version number of the secret split stored in databases 32 and 22. Upon receiving this notification, blue server checks the version number against an expected version number; if these match then blue server 12 is ready to begin the proactivization process.

Blue server 12 sends a message to red server 14 to begin the proactivization process. In performing the proactivization process blue server 12 and red server 14 each generate a new verison of the secret splits and store that version, along with the previous version, in respective memory caches 52 and 46. In some arrangements, blue server 12 generates a new version of the secret share by performing an XOR operation with the previous secret split and a hash function that takes as input the random number described above and the secret identifier for that secret (stored in the entry of database 22). The process of generating such a random number will be described in more detail below with respect to FIG. 3a.

As part of the proactivization process, blue server 12 and red server 14 each store a pair of secret splits in their respective databases 22 and 32. One of the pair corresponds to what is now the previous version of the split, while the other corresponds to that generated during the proactivization process. As will be discussed below with respect to FIG. 3a, blue server 12 will determine which of the versions of the split will be used for equivalence operations during proactivization.

Figure 2A:
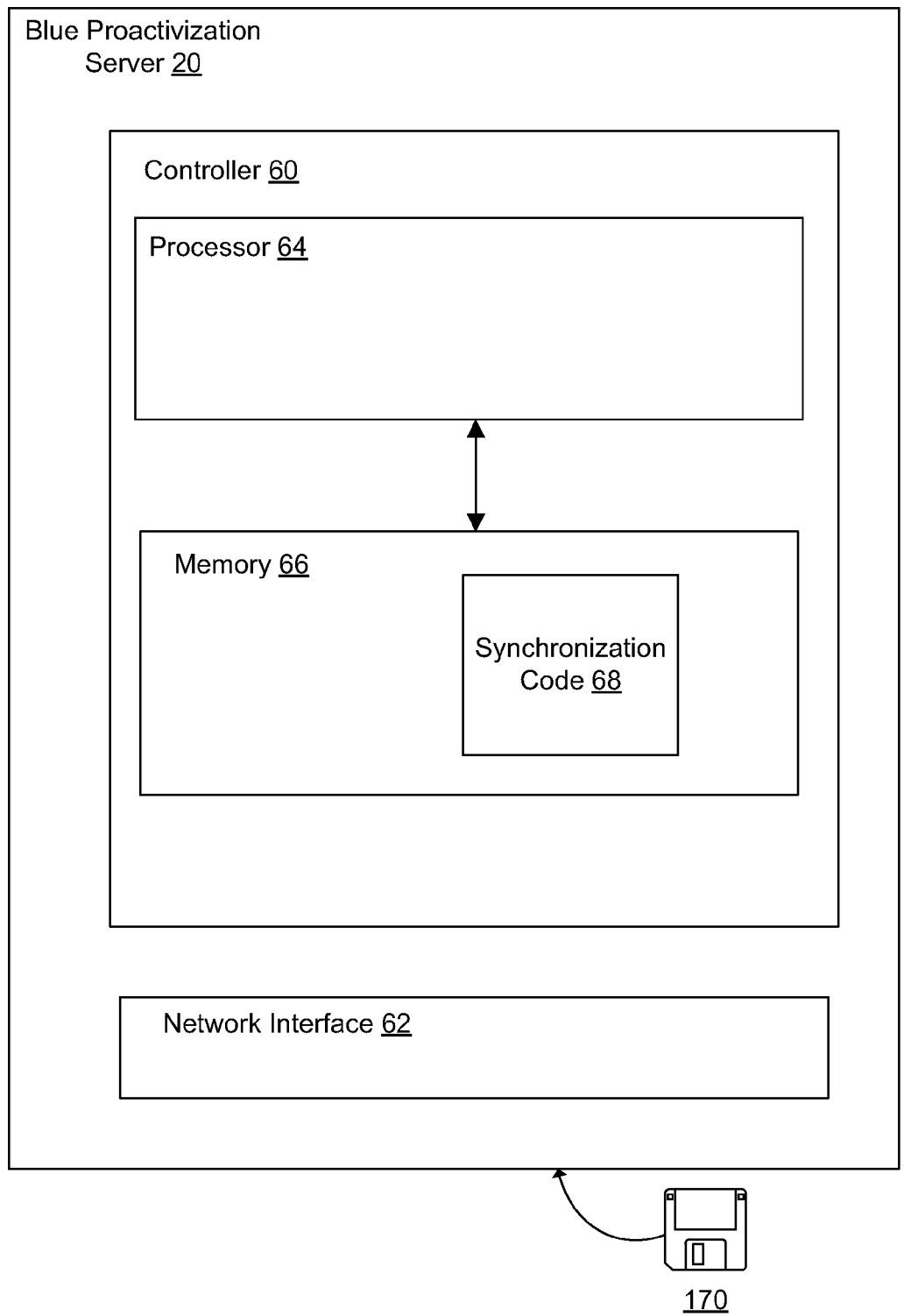
FIG. 2a is a block diagram illustrating an example blue server within the electronic environment shown in FIG. 1.

FIG. 2a illustrates further detail of blue server 12. Blue server 12 includes controller 60, which in turn includes processor 64 and memory 66, and network interface 62.

Network interface 62 takes the form of an Ethernet card; in some arrangements, network interface 62 may take other forms including a wireless receiver or a token ring card. Further, network interface 62 is configured to communicate with memory cache 46 and database 22 over SSL tunnels.

Memory 66 is configured to store code 68 that contains instructions configured to cause the processor to carry out the improved technique, as well as the random number generated as part of the proactivization initialization procedure outlined above with respect to FIG. 1. Memory 66 generally takes the form of, e.g., random access memory, flash memory or a non-volatile memory or a combination thereof. Memory 66 includes synchronization code 68 which includes instructions for carrying out the proactivization process and determining split versions to be used for equivalence.

Processor 64 takes the form of, but is not limited to, Intel or AMD-based MPUs, and can include a single-core or multi-cores each running single or multiple threads. In some arrangements, processor 64 is one of several processors working together.

Figure 2B:
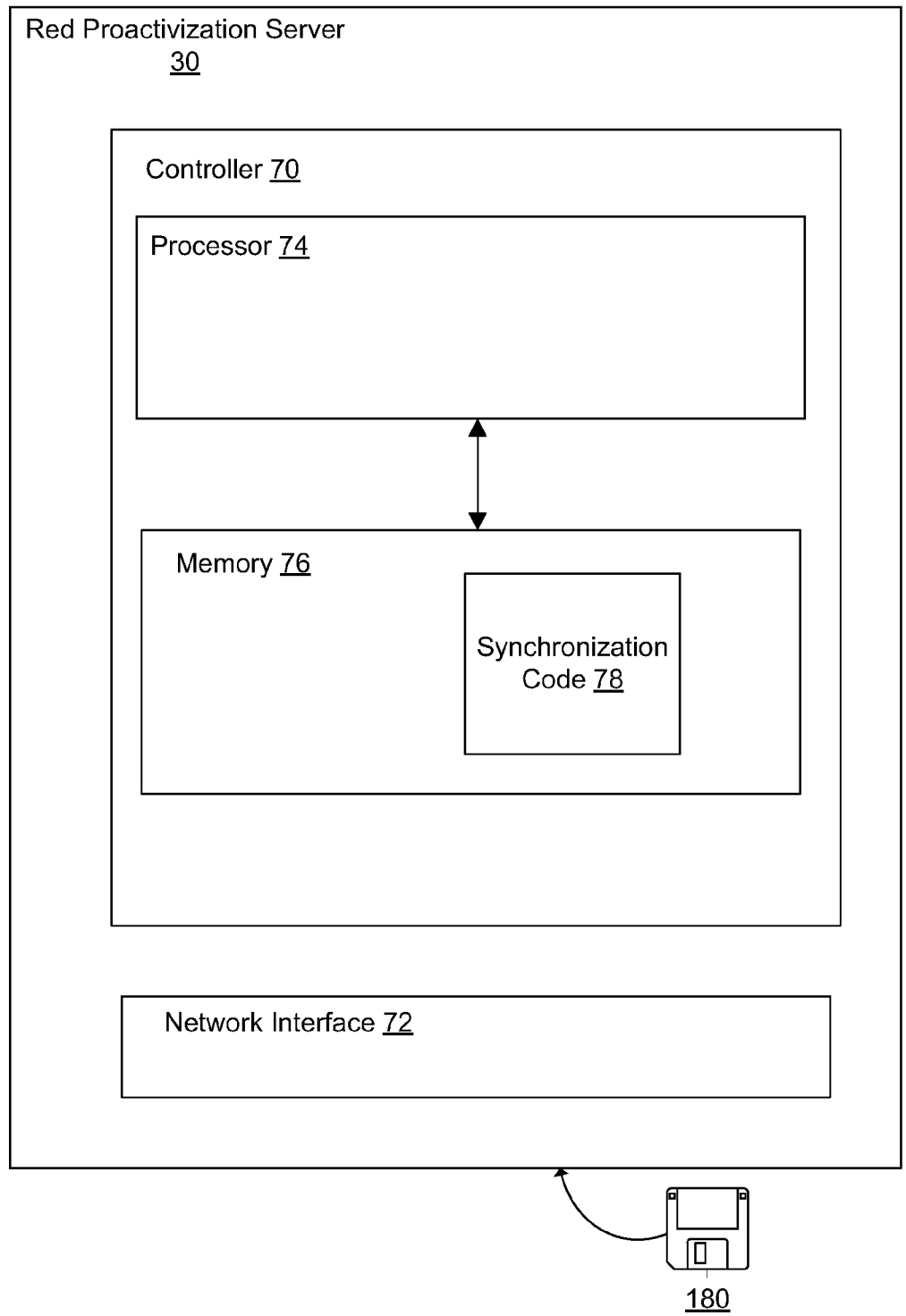
FIG. 2b is a block diagram illustrating an example red server within the electronic environment shown in FIG. 1.

FIG. 2b illustrates further detail of red server 14. Red server 14 includes controller 70, which in turn includes processor 74 and memory 76, and network interface 72.

Network interface 72 takes the form of an Ethernet card; in some arrangements, network interface 72 may take other forms including a wireless receiver or a token ring card. Further, network interface 72 is configured to communicate with memory cache 52 and database 32 over SSL tunnels.

Memory 76 is configured to store code 78 that contains instructions configured to cause the processor to carry out the improved technique, as well as the random number generated as part of the proactivization initialization procedure outlined above with respect to FIG. 1. Memory 76 generally takes the form of, e.g., random access memory, flash memory or a non-volatile memory or a combination thereof. Memory 76 includes synchronization code 78 which includes instructions for carrying out the proactivization process.

Processor 74 takes the form of, but is not limited to, Intel or AMD-based MPUs, and can include a single-core or multi-cores each running single or multiple threads. In some arrangements, processor 74 is one of several processors working together.

Figure 3A:
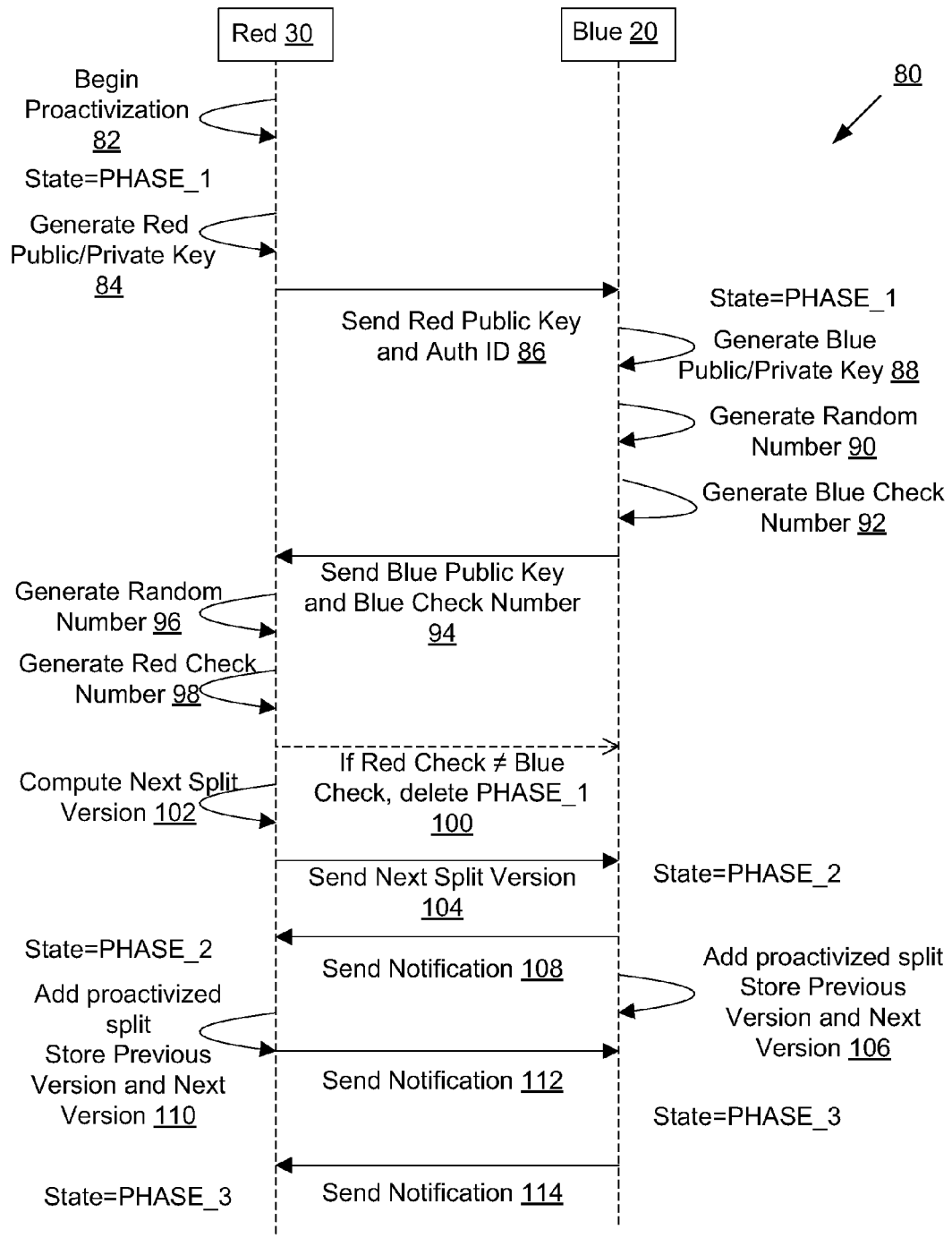
FIG. 3a is a sequence diagram illustrating an example synchronization operation within the electronic system shown in FIG. 1.

FIG. 3a illustrates an example proactivization process 80, which includes communications between red server 14 and blue server 12 that will be described below in detail.

Before describing proactivization process 80, it should be understood that, in this case, proactivization process 80 is split into four phases, each of which will be defined below. Red server 14 and blue server 12 are each defined by a state whose value is stored in respective memory caches 52 and 46, corresponding to the state of proactivization process 80 in which it is operating. In the case in which no such process is being carried out, the corresponding state value is IDLE. The initial split version for both blue and red is denoted X, and the initial version set is denoted as [X].

In step 82, red server 14 receives a message to begin proactivization process 80. For example, processor 74 may generate such a signal based on a schedule stored in memory 76 (not pictured). In some arrangements, however, red server 14 receives such a message from an external source. In reaction to this message, red server 14 sets its state to PHASE_1, signifying that it is entering the first phase of proactivization process 80.

In step 84, processor 74 generates a red public/private key pair. Such a public/private key pair may be generated using standard cryptographic techniques, e.g., RSA. In some arrangements, processor 74 derives this key pair using an elliptic curve Diffie-Hellman (ECDH) protocol.

In step 86, processor 74 sends a message containing the red public key and an authentication identifier to blue server 12. Upon receiving this message, blue server 12 sets its state to PHASE_1. It should be understood, however, that the state of blue server 12 is assumed to be IDLE initially. If that state is something other than IDLE, then processor 64 sends a message (not pictured) to red server 14 that it is not ready for proactivization process 80; in this case, red server 14 sets its state back to IDLE.

In step 88, processor 64 generates a blue public/private key pair. Such a public/private key pair may be generated using standard cryptographic techniques, e.g., RSA. In some arrangements, processor 64 derives this key pair using the ECDH protocol.

In step 90, processor 64 generates a blue random number based on the blue private key and the red public key. It is this random number that will be used in proactivization operations in PHASE_2. In some arrangements, the blue random number is a hash of a shared secret derived from the blue private key and the red public key, the shared secret defined within the ECDH protocol.

In step 92, processor 64 generates a blue check number from the blue random number and the authentication identifier. In some arrangements, the blue check number is a hash of a concatenation of the blue random number and the authentication identifier.

In step 94, processor sends a response containing the blue public key and the blue check number to red server 14.

In step 96, upon receipt of the response, processor 74 generates a red random number based on the red private key and the blue public key. In some arrangements, the red random number is a hash of a shared secret derived from the blue private key and the red public key, the shared secret defined within the ECDH protocol. In any case, the red random number should be identical to the blue random number.

In step 98, processor 74 generates a red check number from the red random number and the authentication identifier. In some arrangements, the red check number is a hash of a concatenation of the red random number and the authentication identifier. Processor 74 then checks the red check number against the blue check number.

In step 100, if the red check number is not equal to the blue check number, then the blue and red random numbers do not agree and proactivization process 80 cannot continue. In this case, both red server 14 and blue server 12 set their respective states to IDLE.

It should be understood at this point that message containing error notifications may take the form of HTTP response code implemented through an HTTP API. Such response generation may be implemented in any scripting code used by an internet browser, e.g., Perl.

In step 102, if the red check number is equal to the blue check number, then processor 74 computes the next version of the split. This takes the form of a number by which the splits in the database will be referred. The authentication servers will choose a particular split version based on whether it is the previous version or the next version of the split is to be used, as determined by blue server 12.

In step 104, processor 74 sends a message containing the next version of the split. It should be understood that blue server 12 has an expected value for this next version; if the value received in the message does not match this expected value, then processor 64 sends an error message to red server 14; both servers then return to an IDLE state.

In step 106, given that the value received in the message from step 104 does match this expected value, blue server 12 sets its state to PHASE_2. It also sets the value of a PREVIOUS_VERSION parameter to the split version and the value of a NEXT_VERSION parameter to the next version in the message. Processor 64 stores these values in memory cache 46.

In step 108, processor 64 sends a message to red server 14 without content. This message implicitly tells red server 14 to begin phase 2 of proactivization process 80. Upon receipt of this message, red server 14 sets its state to PHASE_2.

In step 110, sets the value of its PREVIOUS_VERSION parameter to the split version and the value of its NEXT_VERSION parameter to the next version in the message. Processor 74 stores these values in memory cache 52.

Blue server 12 and red server 14 then begin a thread of generating, for each secret, proactivized splits and storing them in their respective databases 22 and 32. The version of these proactivized splits has the value of NEXT_VERSION. The versions in use are PREVIOUS_VERSION and NEXT_VERSION.

In some arrangements, processors 64 and 74 compute the proactivized splits as follows:
PROACT_SPLIT=SECRET_SPLIT XOR SHA256(SECRET_ID, random number),
where the random number is the common random number derived in steps 90 and 96, and SECRET_SPLIT is the currently used split.

In step 112, when red server 14 completes its thread, it sends a message to blue server 12 which is a notification that red server 14 has completed its thread. Upon receiving this message, if blue server 12 has not completed its thread then it returns with a message indicating it is not complete. Red server 14 continues to send this message 20 until it receives a notification from blue server 12.

In step 114, processor 64 sends a message to red server 14 which is a notification that blue server 12 has completed its thread and is in state PHASE_3. Upon receiving this message, red server 14 sets its state to PHASE_3.

Figure 3B:
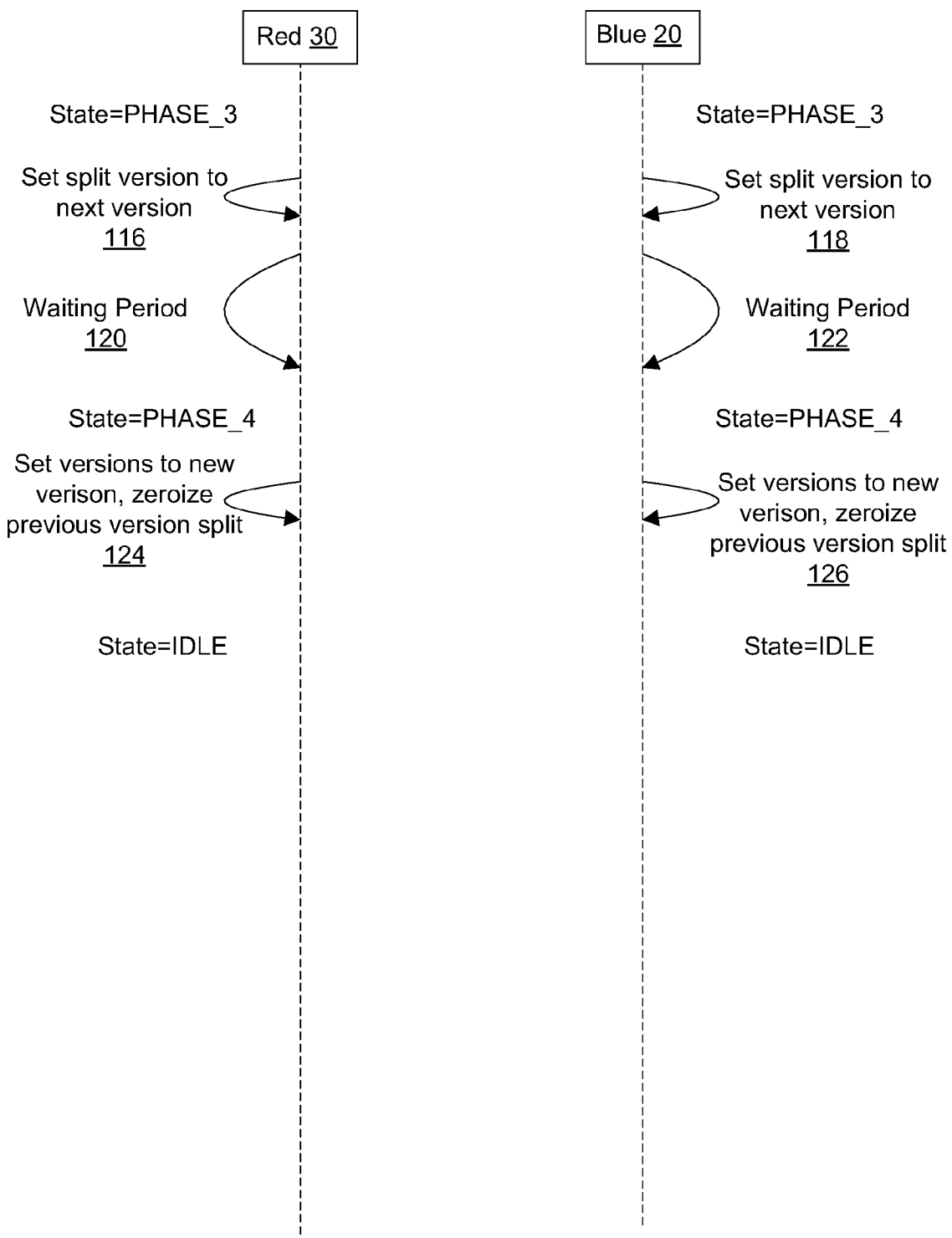
FIG. 3b is a sequence diagram illustrating an example synchronization operation within the electronic system shown in FIG. 1.

Further details of proactivization process 80 are described below with respect to FIG. 3b.

In steps 116 and 118, blue server 12 and red server 14 set their respective split version to NEXT_VERSION.

In steps 120 and 122, blue server 12 and red server 14 each enter a waiting period for a specified length of time. The purpose of such a waiting time is to allow authentication operations that were initiated with PREVIOUS_VERSION to run to completion before entering the next phase. At the end of this waiting period, both the blue server 12 and red server 14 set their respective states to PHASE_4.

In steps 124 and 126, blue server 12 and red server 14 each wind down proactivization process 80 by zeroizing the previous versions of the splits, setting the versions to NEXT_VERSION only, and clearing values such as the random number from memory 66 and 76, and memory cache 46 and 52. Blue server 12 and red server 14 then set their respective states to IDLE.

It should be understood that the above discussion did not take into account what happens when a client 16 (see FIG. 1) sends secret shares to red server 12 and blue server 14 for authentication. As mentioned previously, blue server 12 determines the split version to be used in the subsequent equivalence operation. This is detailed below with respect to FIG. 4.

Figure 4:
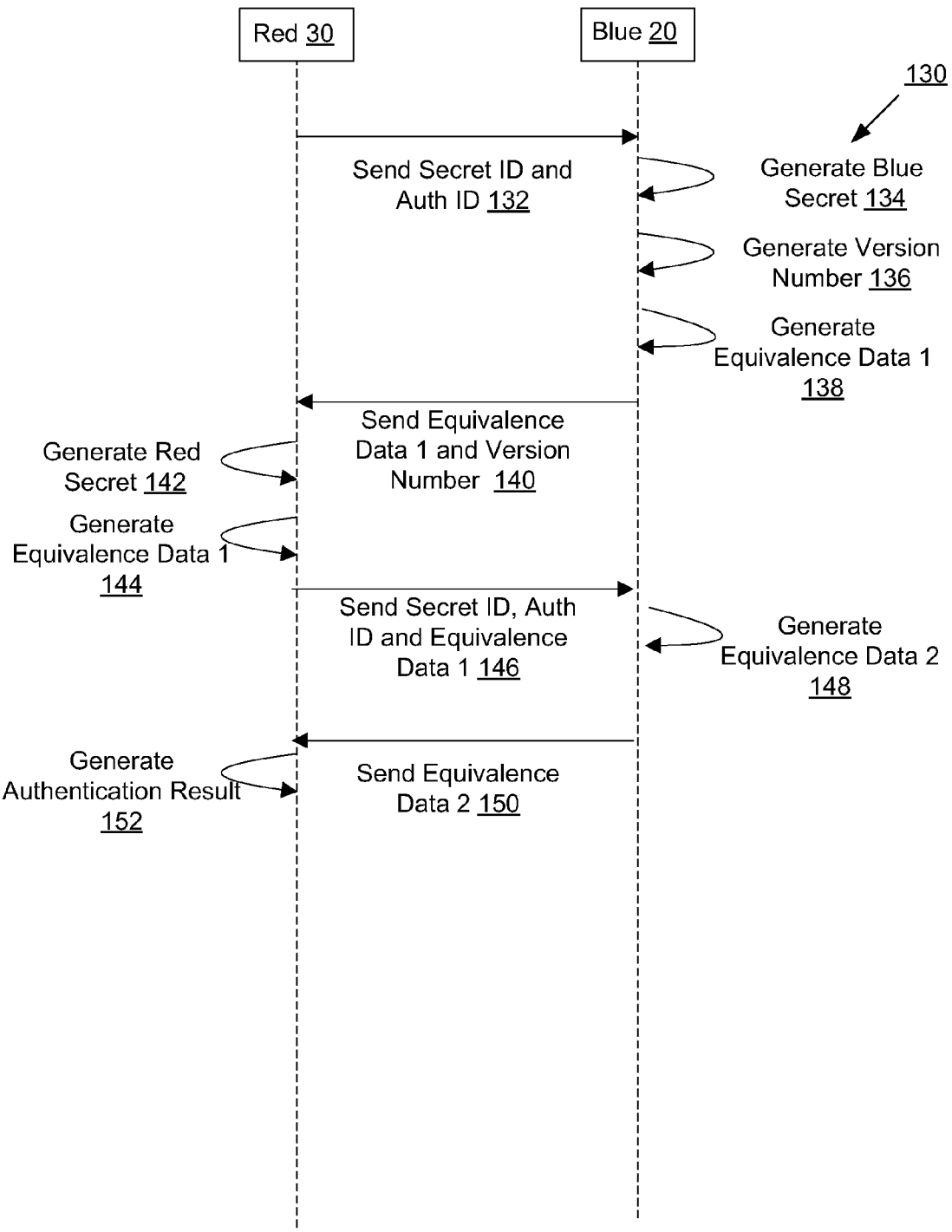
FIG. 4 is a sequence diagram illustrating an example equivalence operation within the electronic system shown in FIG. 1.

FIG. 4 illustrates an equivalence protocol 130 that takes place during proactivization. In step 132, red server 14 sends blue server 12 a message containing an authentication identifier and a secret identifier.

In step 134, upon receiving the message, blue server 12 generates a blue secret from the secret identifier.

In step 136, blue server 12 determines the version of the secret split to be used for equivocation. This version will depend on the states of blue server 12 and red server 14 although whatever version is chosen must be one that both servers have. In some arrangements, the version chosen will also depend on the states of other red and blue servers that may accept secret shares from client 16. For example, blue server 12 has knowledge of whether red server 14 has entered phase 3 of proactivization process 80 and whether red server 14 has completed the generation thread from phase 2. If red server 14 has not completed either of these and therefore has no new split versions in its database, then blue server 12 chooses the previous version of the split.

In step 138, blue server 12 generates a first blue equivalence result based on the blue secret and a blue secret share input from a client 16. This assumes that a registration of the client's secret has already taken place; in this case, the first blue equivalence result may be based on a difference between the secret split obtained from the database 22 and the blue secret share input.

In step 140, blue server 12 sends a message containing the first blue equivalence result and the version of the secret split to red server 14.

In step 142, upon receipt of the message, red server 14 generates a red secret from the secret identifier and the version.

In step 144, red server 14 generates a first red equivalence result from the red secret and a red secret share input from client 16.

In step 146, red server 14 sends a message to blue server 12 containing the authentication identifier, the secret identifier, and the first red equivalence result.

In step 148, upon receiving the message, blue server 12 generates a second blue equivalence result based on the first red equivalence result.

In step 150, blue server 12 sends a message containing the second blue equivalence result to red server 14.

In step 152, upon receiving the message, red server 14 generates an authentication result based on the second blue equivalence result. It is this authentication result as well as the blue equivalence result that is used to authenticate client 16.

Figure 5:
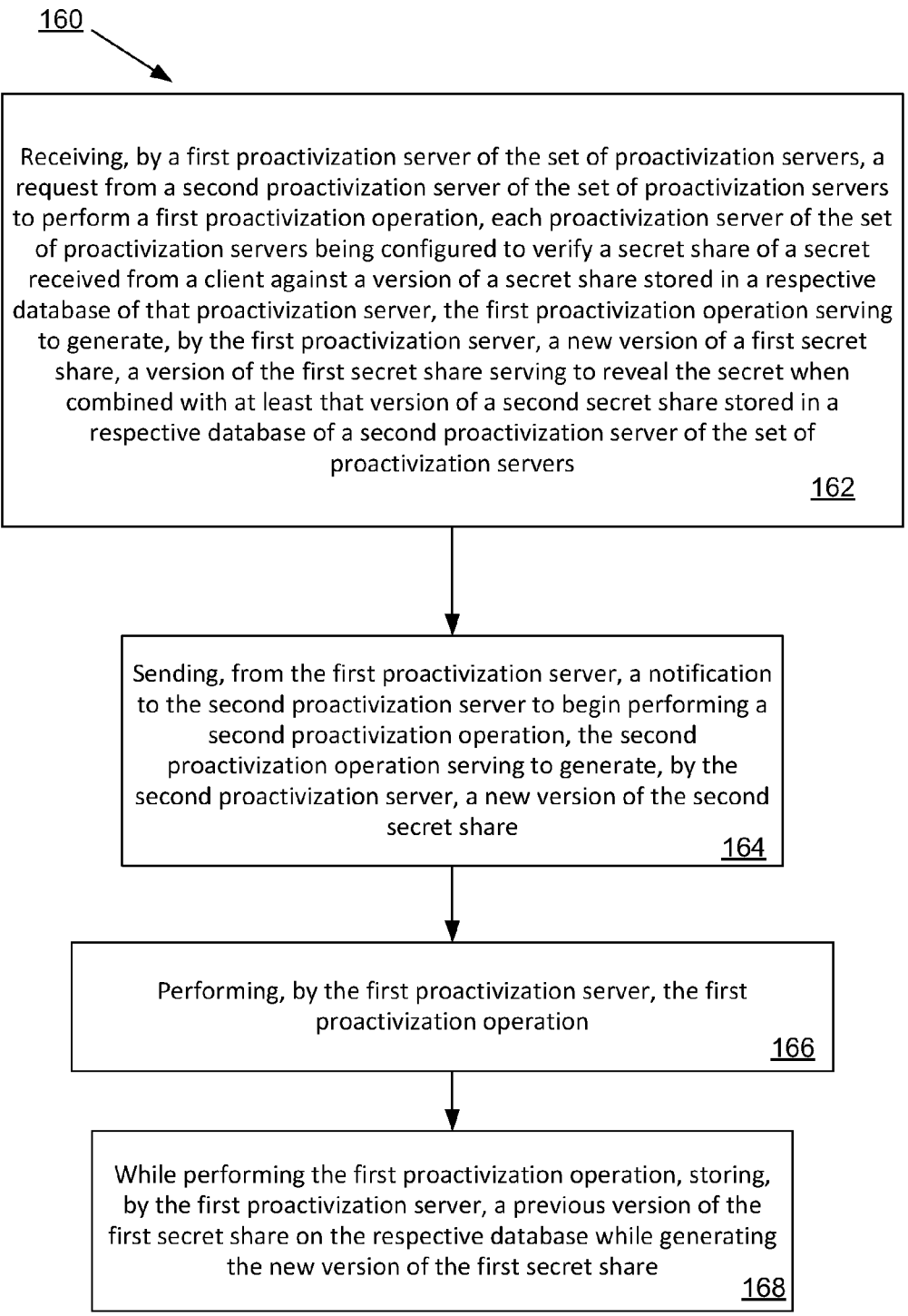
FIG. 5 is a flow chart illustrating an example method of carrying out the improved technique within the electronic environment shown in FIG. 1.

FIG. 5 illustrates a method 160 of synchronizing a set of authentication servers, including steps 162, 164, 166, and 168. In step 162, a request is received from a second authentication server of the set of authentication servers to perform a first proactivization operation, each authentication server of the set of authentication servers being configured to verify a secret share of a secret received from a client against a version of a secret share stored in a respective database of that authentication server, the first proactivization operation serving to generate, by the first authentication server, a new version of a first secret share, a version of the first secret share serving to reveal the secret when combined with that version of a second secret share stored in a respective database of a second authentication server of the set of authentication servers. In step 164, a notification is sent to the second authentication server to begin performing a second proactivization operation, the second proactivization operation serving to generate, by the second authentication server, a new version of the second secret share. In step 166, the first proactivization operation is performed. In step 168, a previous version of the first secret share is stored on the respective database while generating the new version of the first secret share.

While various embodiments of the invention have been particularly shown and described, it will be understood by those skilled in the art that various changes in form and details may be made therein without departing from the spirit and scope of the invention as defined by the appended claims.

For example, it should be understood that the improved technique makes it possible to design recovery procedures in the event that one of the red or blue servers fail, without compromising secret shares. For example, on a restart in the case of a blue server failure, the red server reads the split version and the versions and takes steps based on this information. A similar procedure may be designed for the reverse case.

Furthermore, it should be understood that some embodiments are directed to blue server 12, which is constructed and arranged to synchronize a set of authentication servers. Some embodiments are directed to a process of synchronizing a set of authentication servers. Also, some embodiments are directed to a computer program product which enables computer logic to synchronize a set of authentication servers.

In some arrangements, blue server 12 and red server 14 are implemented by a set of processors or other types of control/processing circuitry running software. In such arrangements, the software instructions can be delivered to blue server 12, either in the form of a computer program product 170 and 180 (see FIGS. 2a and 2b) or simply instructions on disk or in pre-loaded in memory 66 and 76 of blue server 12 and red server 14 respectively, each computer program product having a non-transitory computer readable storage medium which stores the instructions in a non-volatile manner. Alternative examples of suitable non-transitory computer readable storage media include tangible articles of manufacture and apparatus such as CD-ROM, flash memory, disk memory, tape memory, and the like.

What is claimed is:

1. A method of synchronizing a set of authentication servers, the method comprising:
receiving, by a first authentication server of the set of authentication servers, a request from a second authentication server of the set of authentication servers to perform a first proactivization operation, each authentication server of the set of authentication servers being configured to verify a secret share of a secret received from a client against a version of a secret share stored in a respective database of that authentication server, the first proactivization operation serving to generate, by the first authentication server, a new version of a first secret share, a version of the first secret share serving to reveal the secret when combined with that version of a second secret share stored in a respective database of a second authentication server of the set of authentication servers;

sending, from the first authentication server, a notification to the second authentication server to begin performing a second proactivization operation, the second proactivization operation serving to generate, by the second authentication server, a new version of the second secret share;

performing, by the first authentication server, the first proactivization operation; and while performing the first proactivization operation, storing, by the first authentication server, a previous version of the first secret share on the respective database while generating the new version of the first secret share;

wherein receiving the request from the second authentication server includes:

obtaining, from the request, an authentication identifier and a public key of the second authentication server;

generating a private key/public key pair;

producing, from the private key of the private key/public key pair and the public key of the second authentication server, a first random number;

producing, from the first random number and the authentication identifier, a first check number; and sending the public key of the private key/public key pair and the first check number to the second authentication server, the second authentication server being configured to i) generate a second random number from the public key of the private key/public key pair and the private key of the second authentication server, ii) generate a second check number from the second random number and the authentication identifier, and iii) verify whether the second check number matches the first check number.

2. The method of claim 1, further comprising:

upon completion of the first proactivization operation, verifying, by the first authentication server, whether a notification from the second authentication server was received, the notification including an indication that the second authentication server completed the second proactivization operation.

3. The method of claim 1, further comprising:

receiving a secret share from the client to authenticate the client;

verifying the secret share from the client against one of the previous version of the first secret share and the new version of the secret share.

4. The method of claim 3, wherein the first proactivization operation and the second proactivization operation each include an updating phase and a waiting phase, the updating phase of a proactivization operation performed by a authentication server serving to generate the new version of a secret share and store the previous version of that secret share in the respective database of that authentication server, the waiting phase serving to cause the authentication server to wait a specified amount of time before deleting the previous version of the shared secret from the respective database to allow for concurrent authentication operations to complete;

wherein performing the first proactivization operation includes:

starting the updating phase of the first proactivization operation; and when the updating phase of the first proactivization operation has been completed and the completion message has been received, starting the waiting phase of the first proactivization operation.

5. The method of claim 4, wherein verifying the secret share from the client against one of the previous version of the first secret share and the new version of the secret share includes:

ascertaining as to whether a completion message from the second authentication server has been received, the completion message indicating that the updating phase of the second proactivization operation has been completed;

when the completion message has been received, performing an equivalence operation for the secret share from the client using the new version of the secret share; and when the completion message has not been received, performing the equivalence operation for the secret share from the client using the previous version of the secret share.

6. The method of claim 1, wherein sending the notification to the second authentication server to begin performing the second proactivization operation includes:

receiving a notification from the second authentication server that the second check number matched the first check number, the notification including a proactivization version number;

verifying that the proactivization version number received from the second authentication server matches an expected version number corresponding to the new version of the first shared secret;

when the proactivization version number received from the second authentication server matches the expected version number, creating a response to be sent to the second authentication server acknowledging the expected version number; and when the proactivization version number received from the second authentication server does not match the expected version number, create another response to be sent to the second authentication server serving to cause the second authentication server to return to an idle state.

7. An electronic system constructed and arranged to synchronize a set of authentication servers, the system comprising:

a first authentication server, including:
a network interface;
memory; and
a controller having controlling circuitry coupled to the memory; and a second authentication server, including:
a network interface;
memory; and
a controller having controlling circuitry coupled to the memory;

the controlling circuitry of the first authentication server being constructed and arranged to:

receive a request from a second authentication server of the set of authentication servers to perform a first proactivization operation, each authentication server of the set of authentication servers being configured to verify a secret share of a secret received from a client against a version of a secret share stored in a respective database of that authentication server, the first proactivization operation serving to generate, by the first authentication server, a new version of a first secret share, a version of the first secret share serving to reveal the secret when combined with that version of a second secret share stored in a respective database of a second authentication server of the set of authentication servers;

send a notification to the second authentication server to begin performing a second proactivization operation, the second proactivization operation serving to generate, by the second authentication server, a new version of the second secret share;
perform the first proactivization operation; and
while performing the first proactivization operation, keep the previous version of the first secret share on the respective database while generating the new version of the first secret share;
wherein receiving the request from the second authentication server includes:
obtaining, from the request, an authentication identifier and a public key of the second authentication server;
generating a private key/public key pair;
producing, from the private key of the private key/public key pair and the public key of the second authentication server, a first random number;
producing, from the first random number and the authentication identifier, a first check number; and
sending the public key of the private key/public key pair and the first check number to the second authentication server, the second authentication server being configured to i) generate a second random number from the public key of the private key/public key pair and the private key of the second authentication server, ii) generate a second check number from the second random number and the authentication identifier, and iii) verify whether the second check number matches the first check number.

8. The system of claim 7, wherein the controlling circuitry of the first authentication server is further constructed and arranged to:
upon completion of the first proactivization operation, verify whether a notification from the second authentication server was received, the notification including an indication that the second authentication server completed the second proactivization operation.

9. The system of claim 7, wherein the controlling circuitry of the first authentication server is further constructed and arranged to:
receive a secret share from the client;
verify the secret share from the client against one of the previous version of the first secret share and the new version of the secret share.

10. The system of claim 9,
wherein the first proactivization operation and the second proactivization operation each include an updating phase
and a waiting phase, the updating phase of a proactivization operation performed by a authentication server serving to generate the new version of a secret share and store the previous version of that secret share in the respective database of that authentication server, the waiting phase serving to cause the authentication server to wait a specified amount of time before deleting the previous version of the shared secret from the respective database to allow for concurrent authentication operations to complete;
wherein performing the first proactivization operation includes:
starting the updating phase of the first proactivization operation; and
when the updating phase of the first proactivization operation has been completed and the completion message has been received, starting the waiting phase of the first proactivization operation.

11. The system of claim 10,
wherein verifying the secret share from the client against one of the previous version of the first secret share and the new version of the secret share includes:
ascertaining as to whether a completion message from the second authentication server has been received, the completion message indicating that the updating phase of the second proactivization operation has been completed;
when the completion message has been received, performing an equivalence operation for the secret share from the client using the new version of the secret share; and
when the completion message has not been received, performing the equivalence operation for the secret share from the client using the previous version of the secret share.

12. The system of claim 7,
wherein sending the notification to the second authentication server to begin performing the second proactivization operation includes:
receiving a notification from the second authentication server that the second check number matched the first check number, the notification including a proactivization version number;
verifying that the proactivization version number received from the second authentication server matches an expected version number corresponding to the new version of the first shared secret;
when the proactivization version number received from the second authentication server matches the expected version number, creating a response to be sent to the second authentication server acknowledging the expected version number; and
when the proactivization version number received from the second authentication server does not match the expected version number, create another response to be sent to the second authentication server serving to cause the second authentication server to return to an idle state.

13. A computer program product having a non-transitory, computer-readable storage medium which stores code to synchronize a set of authentication servers, the code including instructions which, when executed by a computer, cause the computer to:
receive a request from a second authentication server of the set of authentication servers to perform a first proactivization operation, each authentication server of the set of authentication servers being configured to verify a secret share of a secret received from a client against a version of a secret share stored in a respective database of that authentication server, the first proactivization operation serving to generate, by the first authentication server, a new version of a first secret share, a version of the first secret share serving to reveal the secret when combined with at least that version of a second secret share stored in a respective database of a second authentication server of the set of authentication servers;
send a notification to the second authentication server to begin performing a second proactivization operation, the second proactivization operation serving to generate, by the second authentication server, a new version of the second secret share;
perform the first proactivization operation; and
while performing the first proactivization operation, store a previous version of the first secret share on the respective database while generating the new version of the first secret share;

wherein receiving the request from the second authentication server includes:
   obtaining, from the request, an authentication identifier and a public key of the second authentication server;
   generating a private key/public key pair;
   producing, from the private key of the private key/public key pair and the public key of the second authentication server, a first random number;
   producing, from the first random number and the authentication identifier, a first check number; and
   sending the public key of the private key/public key pair and the first check number to the second authentication server, the second authentication server being configured to i) generate a second random number from the public key of the private key/public key pair and the private key of the second authentication server, ii) generate a second check number from the second random number and the authentication identifier, and iii) verify whether the second check number matches the first check number.

14. The computer program product of claim 13, wherein the code includes further instructions which, when executed by the computer, cause the computer to:
   upon completion of the first proactivization operation, verify whether a notification from the second authentication server was received, the notification including an indication that the second authentication server completed the second proactivization operation.

15. The computer program product of claim 13, wherein the code includes further instructions which, when executed by the computer, cause the computer to:
   receive a secret share from the client;
   verify the secret share from the client against one of the previous version of the first secret share and the new version of the secret share.

16. The computer program product of claim 15,
wherein the first proactivization operation and the second proactivization operation each include an updating phase and a waiting phase, the updating phase of a proactivization operation performed by a authentication server serving to generate the new version of a secret share and store the previous version of that secret share in the respective database of that authentication server, the waiting phase serving to cause the authentication server to wait a specified amount of time before deleting the previous version of the shared secret from the respective database to allow for concurrent authentication operations to complete;
wherein performing the first proactivization operation includes:
   starting the updating phase of the first proactivization operation; and
   when the updating phase of the first proactivization operation has been completed and the completion message has been received, starting the waiting phase of the first proactivization operation.

17. The computer program product of claim 16,
wherein verifying the secret share from the client against one of the previous version of the first secret share and the new version of the secret share includes:
   ascertaining as to whether a completion message from the second authentication server has been received, the completion message indicating that the updating phase of the second proactivization operation has been completed;
   when the completion message has been received, computing an equivalence operation for the secret share from the client using the new version of the secret share; and
   when the completion message has not been received, computing the equivalence operation for the secret share from the client using the previous version of the secret share.

18. The computer program product of claim 13,
wherein sending the notification to the second authentication server to begin performing the second proactivization operation includes:
   receiving a notification from the second authentication server that the second check number matched the first check number, the notification including a proactivization version number;
   verifying that the proactivization version number received from the second authentication server matches an expected version number corresponding to the new version of the first shared secret;
   when the proactivization version number received from the second authentication server matches the expected version number, creating a response to be sent to the second authentication server acknowledging the expected version number; and
   when the proactivization version number received from the second authentication server does not match the expected version number, create another response to be sent to the second authentication server serving to cause the second authentication server to return to an idle state.

19. A method of synchronizing a set of authentication servers, the method comprising:
   receiving, by a first authentication server of the set of authentication servers, a request from a second authentication server of the set of authentication servers to perform a first proactivization operation, each authentication server of the set of authentication servers being configured to verify a secret share of a secret received from a client against a version of a secret share stored in a respective database of that authentication server, the first proactivization operation serving to generate, by the first authentication server, a new version of a first secret share, a version of the first secret share serving to reveal the secret when combined with that version of a second secret share stored in a respective database of a second authentication server of the set of authentication servers;
   sending, from the first authentication server, a notification to the second authentication server to begin performing a second proactivization operation, the second proactivization operation serving to generate, by the second authentication server, a new version of the second secret share;
   performing, by the first authentication server, the first proactivization operation;
   while performing the first proactivization operation, storing, by the first authentication server, a previous version of the first secret share on the respective database while generating the new version of the first secret share;
   receiving an authentication request that includes a secret identifier;
   generating a first identified secret share from the secret identifier;
   selecting one of the previous version or the new version of the first secret share to produce a selected version of the first secret share;

performing a first equivalence operation on the selected version of the first secret share and the first identified secret share to produce a first equivalence result indicative of whether there is a difference between the first secret share and the first identified secret share;

sending a first message to the second authentication server, the first message including the secret identifier and the first equivalence result;

receiving a second equivalence result indicating whether there is a difference between a selected version of the second secret share and a second identified secret share generated from the secret identifier by the second authentication server; and producing an authentication result based on the second equivalence result, the authentication result indicating whether the authentication request is to be granted.

* * * * *